UNITED STATES PATENT OFFICE.

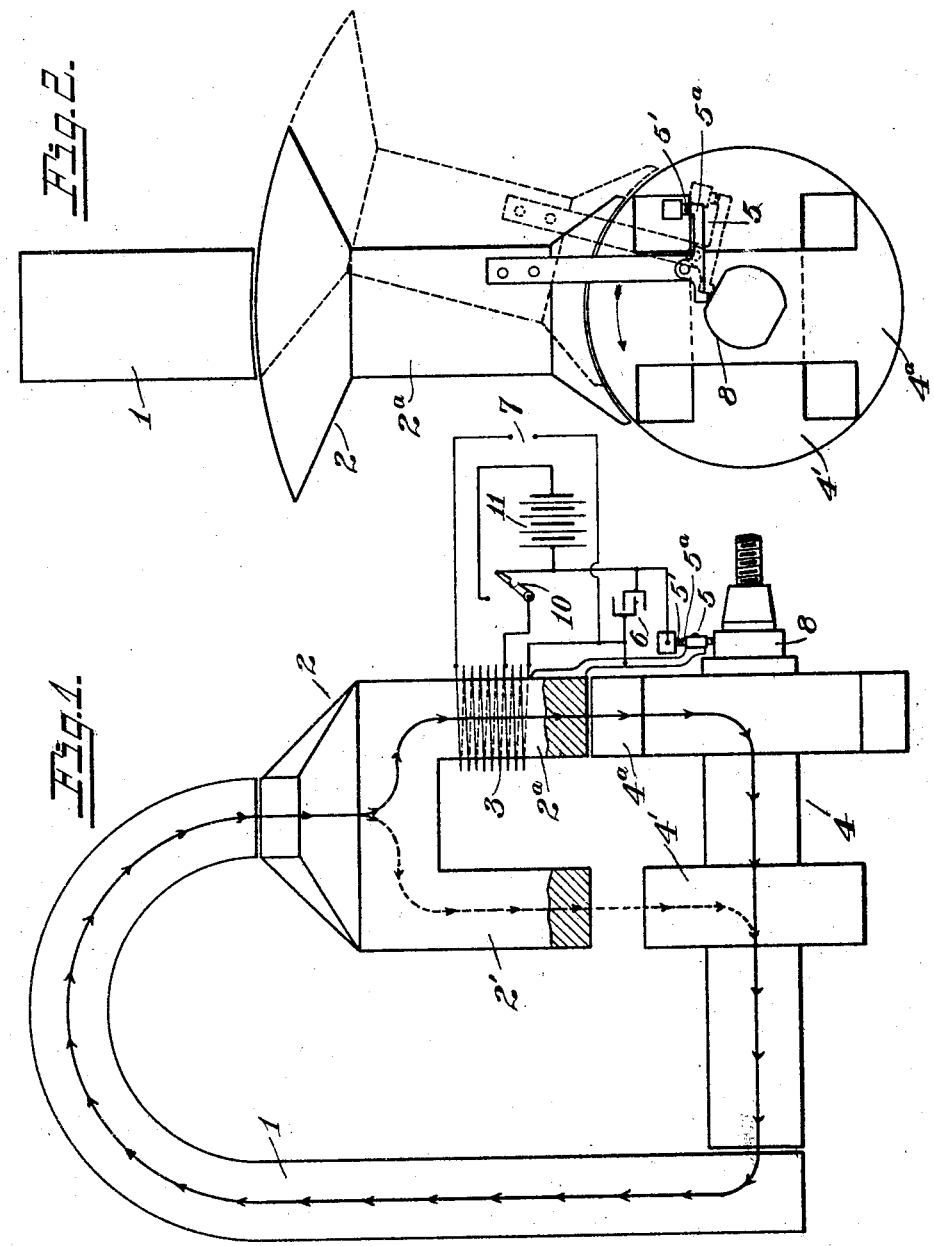

LEON J. LE PONTOIS, OF CLEVELAND, OHIO, ASSIGNOR, BY MESNE ASSIGNMENTS, TO THE TEAGLE COMPANY, OF CLEVELAND, OHIO, A CORPORATION OF OHIO.

METHOD OF GENERATING HIGH-TENSION SPARKS FOR IGNITION PURPOSES.

1,238,534. Specification of Letters Patent. Patented Aug. 28, 1917.

Application filed September 19, 1913, Serial No. 790,588. Renewed November 24, 1916. Serial No. 133,157.

*To all whom it may concern:*

Be it known that I, LEON J. LE PONTOIS, a citizen of the Republic of France, residing at Cleveland, in the county of Cuyahoga and State of Ohio, have invented certain new and useful Improvements in and Relating to Methods of Generating High-Tension Sparks for Ignition Purposes, of which the following is a specification.

My invention relates primarily to an improved method for utilizing the flux of a permanent magnet in the production throughout a wide angular range of adjustment of sparks for ignition purposes, and, secondarily, to utilizing in an economical and efficient manner a direct current from some outside source impressed upon a generating winding in the field of said permanent magnet.

The advantage of providing a relatively wide range of spark adjustment for the operation of various types of hydro-carbon motors is well known. The advantage of maintaining substantially the same value and substantially the same wave shape of generated electrical impulses at a given frequency for all positions within the spark range is also recognized.

Various methods and forms of apparatus have been proposed to meet such requirement but in all of them, as far as I am aware, the relative relations of the electric and magnetic elements used in practising the methods have varied in such a way, as the spark was advanced or retarded within the range of spark adjustment, as to cause serious demagnetizing effects upon the permanent magnets and substantial losses of efficiency.

To use the flux of a permanent magnet at any time in such manner as to oppose or tend to weaken the strength or permanency of the magnet must be productive of inefficient results and ultimate deterioration of the permanent magnet. Yet in all prior methods of and apparatus for utilizing a permanent magnet to generate sparks for ignition purposes throughout a relatively wide angular range of adjustment, in so far as I am advised, the reactions upon the permanent magnets are such as to tend to demagnetize them during some part of the cycle of operation and the utilization of the magnet flux is relatively inefficient. In practice it is well know that permanent magnet demagnetization or deterioration is of common occurrence.

In my improved method the flux of a permanent magnet is utilized in such a manner as always to tend to maintain the strength and permanence of the magnet and to insure substantially the same value and shape of current wave at a given frequency throughout the range of spark adjustment.

My improved method contemplates maintaining the path of least reluctance between the poles of the permanent magnet always so located that the magneto-motive force of any current flowing in the generating winding for any position of spark adjustment within the spark range will always act in the same direction on the poles of the permanent magnet; in other words, the relative mechanical directions of the axis of the generating winding and path of least reluctance between the magnet poles when a current is flowing in the generating winding are maintained the same for all positions of spark adjustment within the range, and any current which flows in the generating winding is maintained always in one and the same direction therein, so that it may be said that the electro-magnetic relationship of the path of least reluctance between the poles of the permanent magnet, which includes the part of the magnet circuit extending through the winding, will remain constant.

Accordingly, the essential steps of my improved method consist in utilizing the flux of a permanent magnet in the production of sparks for ignition purposes throughout a relatively wide angular range by distributing the main flux between the poles of a permanent magnet first through and then outside a generating winding having a spark gap, in such manner as alternately to increase and decrease the flux linking through said winding and to maintain the path of least reluctance always in the same electromagnetic relation to the poles of the permanent magnet, closing and opening an electric circuit through the said winding in a definite timed relation to the said distribution of flux and simultaneously advancing or retarding said distribution of flux and the closing and opening of said circuit, whereby high tension sparks are caused periodically to jump said spark gap.

In carrying out what I have referred to above as the essential steps of my method, it is possible, because of the nature of the steps, to attain certain conditions and relations, and to employ certain additional steps which are advantageous and conducive to the efficiency and success of the method. Thus, in carrying out the essential steps of my method it is possible to maintain at all times a path of relatively low reluctance for the magnetic flux between the poles of the permanent magnet and to keep the total reluctance of the magnetic circuit of the main flux substantially constant throughout the flux cycle for all spark adjustments within the limits of the spark range.

Again, since my method contemplates the maintenance of the path of least reluctance between the poles of the permanent magnet always in the same electro-magnetic relation to the poles of the permanent magnet, by having the circuit through the generating winding closed and opened during flux decrease therethrough, I insure that the current generated in the winding will always flow in the direction to tend to maintain or build up the magnet, irrespective of the position of spark adjustment and the duration of the current wave, there being therefore absolutely no possibility that any magnetic action of the current flowing in the winding will tend to deteriorate the strength or permanency of the magnet. In other words, the direction of the current in the winding and the direction of the winding in relation to the poles of the magnet is always such that for any position throughout the range of spark adjustment the magnetic action of the current flowing in the winding will tend to strengthen or maintain the permanency of the magnet.

I am also enabled to maintain the maximum, minimum and average reluctance of the magnetic circuit through the winding the same for all spark adjustments within the spark range during the utilized part of the flux cycle, thus insuring uniformity of current output for a given frequency for all positions of such spark adjustment.

In so far as possible the elimination of losses due to hysteresis and eddy currents is essential in enabling the flux between the poles of the permanent magnets to be used most efficiently and economically. In carrying out my method I maintain between the magnet poles a flux path which always has the same direction with relation to the poles of the permanent magnet, thereby eliminating losses incident to flux reversals in the magnetic circuit.

For the purpose of illustration I have shown diagrammatically in the accompanying drawing devices by means of which my improved method may be practised.

Figure 1 is a side elevation of such devices, and Fig. 2 is an end elevation of the same with the wiring omitted. In the drawing 1 is a permanent magnet of any well known character. Adjacent one pole of the magnet is an oscillatable pole piece 2 having an unwound polar projection 2′ and a polar projection 2ª carrying a generating winding 3. A homo-polar flux distributer 4 extends between the polar surfaces of the polar projections 2′, 2ª and the other pole of the permanent magnet. It has flux distributing sections 4′, 4ª arranged at right angles to each other, the one 4ª being disposed to have its polar surfaces move in a path closely adjacent to the polar surface of the wound polar projection 2ª and the other 4′ disposed to have its polar surfaces move in a path closely adjacent the polar surface of the unwound polar projection 2′.

This flux distributer when turned is adapted alternately to increase and decrease the flux linking through the winding 3 by first establishing a path of least magnetic reluctance through said winding and between the wound polar projection and the magnet pole of opposite polarity, and then a path of least reluctance between said last described magnet pole and the unwound polar projection. In the drawing the first of these two paths is indicated by the full line and the second is indicated by the broken line. There is never any reversal of the flux in the elements which constitute the magnetic path between the magnet poles.

The oscillatable pole piece 2 may oscillate about the axis of the homo-polar flux distributer and carry the contact terminals 5′, 5ª of a suitable circuit opening and closing mechanism or breaker 5. A condenser 6 is arranged in parallel with the breaker terminals, and there is a spark plug 7 in the circuit of the generating winding as illustrated. Opening and closing of an electric circuit through the generating winding is accomplished in a definite timed relation to the movement of the flux distributer by a cam 8 which has a fixed relation to said distributer and is adapted to open and close the terminals of the breaker 5. Since the breaker is carried by the oscillatable pole piece, angular movement of the breaker to advance or retard the spark is accomplished by a simultaneous angular movement of the pole piece, and the relations of the polar projection 2′ and 2ª to the flux distributer and the relation of the flux path to the generating winding, when the circuit is opened and closed, therefore remain constant for all spark adjustments.

The elements of the apparatus should be shaped, disposed and correlated in such manner, that, assuming the flux distributer to be in the position shown in the diagram, the circuit opening and closing mechanism would operate to close an electric circuit through the generating winding during decrease of the flux through said winding and to open the circuit while the flux through said winding is still decreasing. As indicated, the electric circuit through the winding which is controlled by the circuit opening and closing mechanism may constitute the necessary portion of the winding 3 to obtain the desired results at the terminals of the spark plug 7. The circuit breaker terminals should be kept apart during increase of the flux linking the winding to insure that no current will be induced in the winding thereby.

With the elements in the relative positions illustrated in the diagrams and the flux distributer moving in the direction indicated by the arrow, the main flux will be linking the winding and decrease of flux through the winding will begin to take place as soon as a path of low reluctance is established between the unwound polar projection 2' and section 4' of the flux distributer which coöperates therewith. The reluctance between the wound polar projection 2$^a$ and the flux distributer will increase until finally the flux distributing section 4$^a$ will be separated from the wound polar projection 2$^a$ by an air gap and the main flux will find a path through the unwound polar projection 2' and the flux distributer section 4'. The polar projections and flux distributing sections can be so shaped and correlated as to maintain the total reluctance of the magnetic circuit between the magnet poles substantially constant.

The mechanical direction of the winding relative to the poles of the permanent magnet never changes and the pole piece and flux distributer coöperate to maintain the path of least reluctance between the magnet poles always in the same electro-magnetic relation to the poles of the magnet throughout the range of spark adjustment, irrespective of the angular position of the adjustment of the oscillatable pole piece 2 and breaker 5 within the angular range of the apparatus. Furthermore, it will be noted that the reluctance of the magnetic circuit for any given point in the flux cycle remains substantially constant throughout the range of spark adjustment.

My method of utilizing the flux throughout a wide angular range serves to maintain the permanency of the magnet; to maintain the path of least reluctance between the poles of the permanent magnet always in the same electro-magnetic relation to the said poles; to reduce to a minimum losses due to hysteresis and eddy currents and variations of total reluctance of the magnetic circuit during a cycle of operation; to make possible more efficient and economical use, than heretofore known, of the permanent magnet flux in generating between limits of fully retarded and advanced spark positions, electric current impulses having the same wave shape and value at a given frequency for all spark positions within the range of adjustment; to reduce to a minimum shifting of the flux in the polar ends of the permanent magnet tending to demagnetize it; and to insure that the current generated in the winding will never flow in the direction to demagnetize or tend to demagnetize the permanent magnet, but will flow only in a direction to produce magnetizing effect on the permanent magnet.

My method lends itself admirably to the use of a direct current from some external source, such as a battery, when conditions warrant, as for starting the motor or running the motor under conditions requiring exceptionally hot sparks.

In Fig. 1 a three-way switch 10 and a battery circuit 11 are diagrammatically shown. When the battery is connected into circuit with the generating winding by means of the switch 10, and while a circuit through the winding is closed by the circuit opening and closing mechanism 5, the maximum, average and minimum values of the time constant of the generating winding are the same for all adjustments of the spark throughout the spark range. This enables me to establish a definite and constant relation between the battery and the generating winding and to maintain it for all positions of spark adjustment, which is of great advantage not only in insuring greater uniformity of current value of sparks throughout the range of adjustment for a given frequency, but also in insuring a more uniform demand on the battery, so that the relation of battery to winding, established properly for any point in the range, will be the same for all points of spark adjustment.

Many widely varying embodiments of my invention and various applications thereof, such as will suggest themselves to those skilled in the art to which my invention relates, may be used and made without departing from the spirit and scope of my invention. My disclosure and the foregoing description are purely illustrative and are not intended to be in any sense limiting.

What I claim is:—

1. The method of utilizing the flux of a permanent magnet in the production of sparks for ignition purposes, it consisting in distributing the main magnetic flux between the poles of a permanent magnet first through and then outside a generating winding having a spark gap, in such a manner as alternately to increase and decrease the flux linking through said winding and to maintain the path of least reluctance always in the same electro-magnetic relation to the poles of the permanent magnet, closing and opening an electric circuit through the said winding in a definite timed relation to the said distribution of flux, and advancing or retarding simultaneously said distribution of flux and the closing and opening of said circuit, whereby high tension sparks are caused periodically to jump said spark gap.

2. The method of utilizing the flux of a permanent magnet in the production of sparks for ignition purposes, it consisting in distributing the magnetic flux between the poles of a permanent magnet first through and then outside of a generating winding having a spark gap, so as alternately to increase and decrease the flux linking through said winding and to maintain the path of least reluctance always in the same electromagnetic relation to the poles of the permanent magnet, closing and opening an electric circuit through the said winding in a definite timed relation to said distribution of flux, and advancing or retarding simultaneously said distribution of flux and the closing and opening of said circuit, meanwhile maintaining the total reluctance of the magnetic circuit substantially constant, whereby high tension sparks having current waves of the same shape and value for a given frequency throughout the range of spark adjustment are caused periodically to jump said spark gap.

3. The method of utilizing the flux of a permanent magnet in the production of sparks for ignition purposes, it consisting in distributing the main magnetic flux between the poles of a permanent magnet first through and then outside a generating winding having a spark gap, in such a manner as alternately to increase and decrease the flux linking through said winding and to maintain the path of least reluctance always in the same electro-magnetic relation to the poles of the permanent magnet, closing and opening an electric circuit through the said winding during decrease of flux therethrough and in a definite timed relation to the said distribution of flux, and advancing or retarding simultaneously said distribution of flux and the closing and opening of said circuit, whereby high tension sparks are caused periodically to jump said spark gap.

4. The method of utilizing the flux of a permanent magnet in the production of sparks for ignition purposes, it consisting in distributing the magnetic flux between the poles of a perminent magnet first through and then outside of a generating winding having a spark gap, so as alternately to increase and decrease the flux linking through said winding and to maintain the path of least reluctance always in the same electro-magnetic relation to the poles of the permanent magnet, closing and opening an electric circuit through the said winding during the decrease of flux therethrough and in a definite timed relation to said distribution of flux, and advancing or retarding simultaneously said distribution of flux and the closing and opening of said circuit, meanwhile maintaining the total reluctance of the magnetic circuit substantially constant, whereby high tension sparks having current waves of the same shape and value for a given frequency throughout the range of spark adjustment are caused periodically to jump said spark gap.

5. The method of utilizing the flux of a permanent magnet in the production of sparks for ignition purposes, it consisting in distributing the main magnetic flux between the poles of a permanent magnet first through and then outside a generating winding having a spark gap in such a manner as alternately to increase and decrease the flux linking through said winding and to maintain the path of least reluctance always in the same electro-magnetic relation to the poles of the permanent magnet and the reluctance of the magnetic circuit through the winding always the same for any given point in the flux cycle, closing and opening an electric circuit through the said winding in a definite timed relation to the said distribution of flux, and advancing or retarding simultaneously said distribution of flux and the closing and opening of said circuit, whereby high tension sparks are caused periodically to jump said spark gap.

6. The method of utilizing the flux of a permanent magnet in the production of sparks for ignition purposes, it consisting in distributing the magnetic flux between the poles of a permanent magnet first through and then outside of a generating winding having a spark gap, so as alternately to increase and decrease the flux linking through said winding and to maintain the path of least reluctance always in the same electromagnetic relation to the poles of the permanent magnet and the reluctance of the magnetic circuit through the winding always the same for any given point in the flux cycle, closing and opening an electric circuit through the said winding in a definite timed relation to said distribution of flux, and advancing or retarding simultaneously said distribution of flux and the closing and opening of said circuit, meanwhile maintaining the total reluctance of the magnetic circuit substantially constant, whereby high tension sparks having current waves of the same shape and value for a given frequency throughout the range of spark adjustment are caused to periodically jump said spark gap.

7. The method of utilizing the flux of a permanent magnet in the production of sparks for ignition purposes, it consisting in distributing the main magnetic flux between the poles of a permanent magnet first through and then outside a generating winding having a spark gap, in such a manner as alternately to increase and decrease the flux linking through said winding and to maintain the path of least reluctance always in the same electro-magnetic relation to the poles of the permanent magnet, closing and opening an electric circuit through the said winding during decrease of flux therethrough and in a definite timed relation to the said distribution of flux, and advancing or retarding simultaneously said distribution of flux and the closing and opening of said circuit, meanwhile maintaining the maximum, minimum and average values of the reluctance of the magnetic circuit through the winding the same while the electric circuit therethrough is closed, whereby high tension sparks having current waves of the same shape and value for a given frequency throughout the range of spark adjustment are caused periodically to jump the spark gap.

8. The method of utilizing the flux of a permanent magnet in the production of sparks for ignition purposes, it consisting in distributing the magnetic flux between the poles of a permanent magnet first through and then outside of a generating winding having a spark gap, so as alternately to increase and decrease the flux linking through said winding and to maintain the path of least reluctance always in the same electromagnetic relation to the poles of the permanent magnet, closing and opening an electric circuit through the said winding during decrease of flux therethrough and in a definite timed relation to said distribution of flux, and advancing or retarding simultaneously said distribution of flux and the closing and opening of said circuit, meanwhile maintaining the total reluctance of the magnetic circuit substantially constant and the maximum, minimum and average values of the reluctance of the magnetic circuit through the winding the same while the electric circuit therethrough is closed, whereby high tension sparks having current waves of the same shape and value for a given frequency throughout the range of spark adjustment are caused periodically to jump said spark gap.

9. The method of generating sparks for ignition purposes, it consisting in linking through a generating winding a magnetic circuit, periodically varying the reluctance of the path of the magnetic flux through said winding, closing and then opening the circuit of a part of said winding by electrically connecting one terminal thereof always to the same terminal of a source of direct current while the reluctance of said magnetic circuit through the winding is varying, varying the time of closing and opening said electric circuit, and maintaining the maximum, average and minimum values of the time constant of the winding while the circuit is closed the same for all adjustments of electric circuit closing and opening.

10. The method of generating sparks for ignition purposes, it consisting of linking through a generating winding a magnetic circuit, periodically varying the reluctance of the path of the magnetic flux through said winding, closing and then opening the circuit of a part of said winding while the reluctance of said magnetic circuit therethrough is increasing, by electrically connecting one terminal thereof always to the same terminal of a source of direct current in such manner that the current flowing in said winding from said source always will have the same direction as the current generated in said winding, varying the time of closing and opening said electric circuit, and maintaining the maximum, average and minimum values of the time constant of the winding the same for all adjustments of electric circuit closing and opening.

11. The method of producing sparks for ignition purposes throughout a range of angular spark adjustment, it consisting in varying the reluctance of a magnetic circuit through a generating winding located in a magnetic field, thereby setting up an electromotive force in said winding, closing and opening an electric circuit between an external source of current supply and said winding in such manner that the current permitted to flow from said source through said winding will be in the same direction as said electromotive force set up in the winding, and varying the time of closing and opening said electric circuit while maintaining the average time constant of the winding the same for all positions of spark adjustment throughout the range of the generator.

12. The method of utilizing magnetic flux in the production of sparks for ignition purposes, it consisting in distributing the flux first through and then outside of a generating winding having a spark-gap, so as to alternately increase and decrease the flux linking through said winding and to maintain the path of least reluctance for the magnetic circuit always in the same electromagnetic relation to the source of such magnetic flux, closing and opening an electric circuit through said winding in a definite timed relation to said distribution of flux, and advancing or retarding simultaneously said distribution of flux and the closing and opening of said circuit, whereby high tension sparks having current waves of like shape and value for a given frequency throughout the range of spark adjustment are caused periodically to jump said spark gap.

In testimony whereof I affix my signature in the presence of two witnesses.

LEON J. LE PONTOIS.

Witnesses:
GEO. A. WELCH,
EDWARD R. ALEXANDER.